(12) United States Patent
Pinder et al.

(10) Patent No.: US 8,320,932 B2
(45) Date of Patent: Nov. 27, 2012

(54) METHOD AND SYSTEM OF UTILIZING A CONTEXT VECTOR AND METHOD AND SYSTEM OF UTILIZING A CONTEXT VECTOR AND DATABASE FOR LOCATION APPLICATIONS

(75) Inventors: Ellis A. Pinder, Davie, FL (US); Charles B. Swope, Coral Springs, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 432 days.

(21) Appl. No.: 11/279,345

(22) Filed: Apr. 11, 2006

(65) Prior Publication Data

US 2007/0239813 A1 Oct. 11, 2007

(51) Int. Cl.
*H04W 24/00* (2009.01)

(52) U.S. Cl. ............ 455/456.1; 455/456.2; 701/30.9; 701/31.1; 701/45; 702/47; 702/116; 706/12

(58) Field of Classification Search .......... 455/419, 455/423, 456.1, 457, 574; 701/214; 706/12, 706/45
See application file for complete search history.

(56) References Cited

U.S. PATENT DOCUMENTS

| | | | | |
|---|---|---|---|---|
| 6,313,786 | B1* | 11/2001 | Sheynblat et al. | 342/357.02 |
| 8,035,508 | B2* | 10/2011 | Breed | 340/539.11 |
| 2001/0055965 | A1* | 12/2001 | Delp et al. | 455/420 |
| 2002/0083025 | A1* | 6/2002 | Robarts et al. | 706/12 |
| 2002/0169733 | A1* | 11/2002 | Peters, II | 706/45 |
| 2003/0158664 | A1* | 8/2003 | Swope et al. | 701/214 |
| 2004/0002948 | A1* | 1/2004 | Mantyjarvi et al. | 707/1 |
| 2004/0153373 | A1* | 8/2004 | Song et al. | 705/26 |
| 2004/0203891 | A1* | 10/2004 | Cole et al. | 455/456.1 |
| 2005/0177290 | A1* | 8/2005 | Farmer | 701/45 |
| 2005/0206518 | A1* | 9/2005 | Welch et al. | 340/539.12 |
| 2005/0250440 | A1* | 11/2005 | Zhou et al. | 455/12.1 |
| 2006/0004680 | A1* | 1/2006 | Robarts et al. | 706/12 |
| 2007/0026871 | A1* | 2/2007 | Wager | 455/456.1 |
| 2007/0056369 | A1* | 3/2007 | Griffin et al. | 73/504.14 |

* cited by examiner

*Primary Examiner* — Meless N Zewdu
*Assistant Examiner* — Amanuel Lebassi
(74) *Attorney, Agent, or Firm* — Barbara R. Doutre

(57) ABSTRACT

A system (100) and method (300) of using a context vector and database (202) for location applications can include a transceiver (104), a plurality of environmental sensors (114, 116, 118, 120, 121) including at least two location technology devices (110, 112), and a processor (102) coupled to the transceiver and the plurality of environmental sensors. The processor can be programmed to sense (302) an environmental condition for a given location, define (310) a context vector for the given location, detect (312) a context transition corresponding to a change in the environmental condition, and modify (314) an operation of the at least two location technology devices based on the context transition detected. The processor can be further programmed to form (320) a new context vector based on the context transition and attempt to match the new context vector with a pre-stored context vector.

16 Claims, 2 Drawing Sheets

300

METHOD AND SYSTEM OF UTILIZING A CONTEXT VECTOR AND METHOD AND SYSTEM OF UTILIZING A CONTEXT VECTOR AND DATABASE FOR LOCATION APPLICATIONS

FIELD OF THE INVENTION

This invention relates generally to communication and location technologies, and more particularly to a method and system of using location technologies within context vectors to improve communication device functionality.

BACKGROUND

In indoor environments or urban areas where GPS is unusable or less reliable, alternate technologies must be utilized to provide location. Beacons or inertial navigation are useful technologies in such circumstances, and these technologies have their strengths and weaknesses. Deploying beacons in numerous indoor environments obviously can involve great cost if significant coverage and greater accuracy is desired. Other data that is available from indoor environments is not currently being extracted or at least extracted in a useful manner to improve both communication and location services.

SUMMARY OF THE INVENTION

Embodiments in accordance with the present invention can use the environmental context of a radio as a supplemental technology to provide location or increased confidence of location. Additionally, it is desirable to use context information to detect context transitions which can be used to activate, suspend, favor, disfavor, or initiate certain location technologies. This context information can reduce the processing needs of the radio, reduce current consumption, and further result in a faster position fix.

In a first embodiment of the present invention, a method of using context vectors in location applications can include sensing an environmental condition for a given location, defining a context vector for the given location (where the context vector includes a value for the environmental condition sensed), detecting a context transition corresponding to a change in the environmental condition, and modifying an operation of location applications in a communication device based on the context transition detected. The method can further include the step of forming a new context vector based on the context transition and attempting to match the new context vector with a pre-stored context vector. A new context vector can be created and stored if the new context vector fails to match a pre-stored context vector. The method can also aggregate information from sensors used to sense the environmental condition. Modifying the operation of location application applications can be done by activating, suspending, favoring, disfavoring or initiating a particular location technology among a plurality of location technologies used in a communication device based on the context transition detected. In one particular arrangement, the step of modifying the operation of location applications can include suspending or disfavoring a GPS location technology used in a communication device based on a context transition detected indicative of being indoors. The environmental condition can be detected by detecting a light frequency, a light intensity, a light type, a humidity level, a temperature level, a pressure level, a scent, a carbon dioxide level, an oxygen level, a nitrogen level, a hazardous gas detector, a sound pressure level, a tone level, a sound frequency, an altitude, a longitude, or a latitude. Note, the "environmental condition" can be considered any one of the aforementioned conditions singly or in any combination and can optionally include location information such as altitude, longitude or latitude. In one particular arrangement, detecting the environmental condition can involve detecting a particular light frequency or frequency range of interest among such as 50 Hertz, 60 Hertz, 400 Hertz or the frequency of natural light. In another arrangement, detecting the environmental condition can involve detecting a temperature level or a pressure level and a time, a calendar date, and a location. The method can further include modifying a confidence level in a given location reading based on the context transition detected.

In a second embodiment of the present invention, a communication system using context vectors in location applications can include a transceiver, a plurality of environmental sensors including at least two location technology devices, and a processor coupled to the transceiver and the plurality of environmental sensors. The processor can be programmed to sense an environmental condition for a given location, define a context vector for the given location (where the context vector includes a value for the environmental condition sensed), detect a context transition corresponding to a change in the environmental condition, and modify an operation of the at least two location technology devices based on the context transition detected. The plurality of sensors can include a temperature sensor, a light sensor, a pressure sensor, a gas sensor, or a portable inertial navigation system, and the processor can be programmed to aggregate information from the plurality of sensors used to sense the environmental condition. The processor can be further programmed to form a new context vector based on the context transition and attempt to match the new context vector with a pre-stored context vector and further create a new context vector and store the new context vector if the new context vector fails to match a pre-stored context vector. The processor can be programmed to modify the operation of the at least two location technology devices by activating, suspending, favoring, disfavoring or initiating a particular location technology device among the at least two location technology devices used in a communication device based on the context transition detected. The processor can be further programmed to detect the environmental condition by detecting a light frequency, a light intensity, a light type, a humidity level, a temperature level, a pressure level, a scent, a carbon dioxide level, an oxygen level, a nitrogen level, a hazardous gas detector, a sound pressure level, a tone level, a sound frequency, an altitude, a longitude, or a latitude. In a particular embodiment, the processor can be programmed to detect the environmental condition by detecting a particular light frequency or frequency range of interest among such as 50 Hertz, 60 Hertz, 400 Hertz or the frequency of natural light. Alternatively, the processor can be programmed to detect the environmental condition by detecting a temperature level or a pressure level and a time, a calendar date, and a location. Note, the at least two location technology devices can include at least a GPS device where the processor is programmed to modify the operation of the GPS device by suspending or disfavoring the GPS device used in a communication device in favor of another location technology device based on a context transition detected or a context vector detected indicative of being indoors.

In another embodiment, a method for using context vectors in location applications can include sensing an environmental condition for a given location, defining a first context vector for the given location, wherein the first context vector includes a value for the environmental condition, comparing the first context vector to a second context vector associated with the given location, and establishing a location of a communication device based on the comparison of the first context vector and the second context vector. The method can further include storing the first context vector as the second context vector when the first context vector fails to match the second context vector. The method can also further include the step of uploading the stored second context vector to a database to enable other communication devices on a network to access the uploaded context vector.

Other embodiments, when configured in accordance with the inventive arrangements disclosed herein, can include a system for performing and a machine readable storage for causing a machine to perform the various processes and methods disclosed herein. Note, modifying the operation of location applications can also encompass not only suspending or favoring a particular location technology, but can also optionally include determining or refining the determination of an actual location where a GPS device resides.

The terms "a" or "an," as used herein, are defined as one or more than one. The term "plurality," as used herein, is defined as two or more than two. The term "another," as used herein, is defined as at least a second, third, or more. The terms "including" and/or "having," as used herein, are defined as comprising (i.e., open language). The term "coupled," as used herein, is defined as connected, although not necessarily directly, and not necessarily mechanically. The term "suppressing" can be defined as reducing or removing, either partially or completely.

The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

DETAILED DESCRIPTION OF THE DRAWINGS

Figure 1:
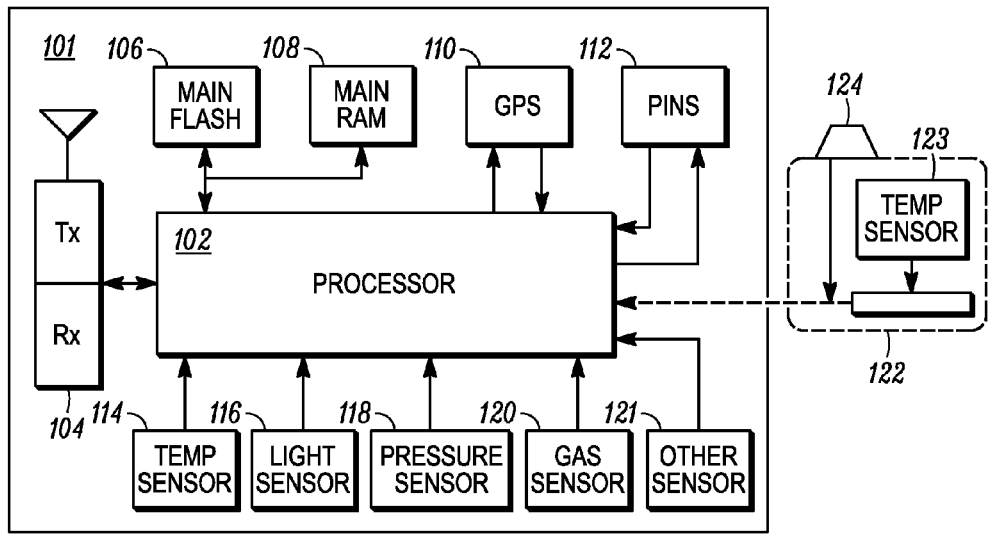
FIG. 1 is an illustration of a communication system or device using a plurality of sensors and context vectors in location applications in accordance with an embodiment of the present invention.

While the specification concludes with claims defining the features of embodiments of the invention that are regarded as novel, it is believed that the invention will be better understood from a consideration of the following description in conjunction with the figures, in which like reference numerals are carried forward.

Referring to FIG. 1, a communication system 100 can include a communication device 101 such as a portable radio and optional accessories such as microphone 122. The communication device 101 or accessory 122 can have one or more environmental sensors for sensing an environmental condition, the sensors including, but not limited to, a light sensor 116 or 124, a temperature sensor 114 or 123, a pressure sensor 118, a gas sensor 120, and other sensors (121) that can include humidity sensors, sound pressure sensors, and radiation sensors as examples. Thus, the environmental condition need not be limited to a single environmental state. Some of these sensors already exist on a radio for other functions, such as the light sensor (for backlight control) and the sound pressure sensor (in the microphone). Signal processing of the light sensor can be used to detect frequencies or frequency ranges such as 50/60 Hz power frequency or the 400 Hz or greater frequencies commonly employed on electronic ballasts. Further note, the communication device 101 can include a transceiver 104 coupled to a processor 102 and memory such as flash memory 106 and random access memory 108. Besides the sensors, the processor 102 can be coupled to location devices such as a global positioning system (GPS) receiver 110 and a portable inertial navigation system (PINS) device 112.

The aggregate information from these sensors, perhaps combined with local time, define a context vector for a given location. A context vector can be absolute, or the context vector can be relative to a known location determined by other means. Multiple locations could potentially have identical context vectors, so a matching algorithm can be used to select the most likely one. In this regard, the context vector itself can be used to determine or refine location.

In another aspect, a current context vector can be compared to temporally proximate context vectors to detect a change of context. Some context transitions may have useful location applications, such as the ability to activate, suspend, favor, disfavor, or initiate certain location technologies. Since GPS devices can easily drain current attempting to obtain a position fix while indoors, embodiments herein can be used to detect a transition between indoors and outdoors, for example, to make a decision whether to suspend or modify GPS operation for the purpose of power savings. Embodiments herein can provide a means to detect an indoor or outdoor radio context, which allows specific location technologies to be favored or disfavored, based on their likelihood of success. Turning off a GPS subsystem when it is not likely to succeed can result in appreciable battery savings.

One of the more cost effective implementations in accordance with the embodiments herein includes the use of the light sensor 116. The communication device 101 in the form of a portable radio typically contains the light sensor 116 which is ordinarily used for detecting ambient light to assist in backlighting control. The light sensor 116 can be a phototransistor or diode having a photo sensor output capable of detecting frequency characteristics of light. In addition to detection of ambient light level, the photo sensor output can be amplified and filtered to detect certain light frequencies of interest, in particular the 50 Hz/60 Hz ranges found in incandescent lighting and the 400 Hz ranges commonly found in electronic ballasts for florescent lighting. The detection and strength of this signal can be used in an algorithm to define context vectors and match such context vectors to appropriately modify the operation of the communication device 101 or its subsystems. Additionally, other frequencies can be detected including those used to detect natural sunlight.

In yet another embodiment, the communication device 101 can include the temperature sensor 114 in the form of a thermistor or an integrated circuit temperature sensor which senses ambient temperature. The temperature sensor 114, along with the light sensor 116, can be present on the radio itself, on a radio accessory, or both, as shown in FIG. 1. (See temperature sensor 123 and light sensor 124 in the accessory 122.)

Additional environmental sensors can also be used, including sensors able to detect certain gases and/or atmospheric composition, pressure sensors, and olfactory sensors. Embodiments herein can periodically sample the environment to obtain aggregate sensor data, or a context vector, and then subsequently store such data. In one embodiment, a time stamp can be included in the context vector because the context may be time-dependent. Context can vary by time and date in a predictable manner in many instances. For example, a basement laundry room may operate from 0700 to 2100 hours local time on Monday through Friday. If this information is known a priori, or if this information can be learned, the confidence level of a context vector can increase, and the confidence in user location can also increase.

Figure 2:
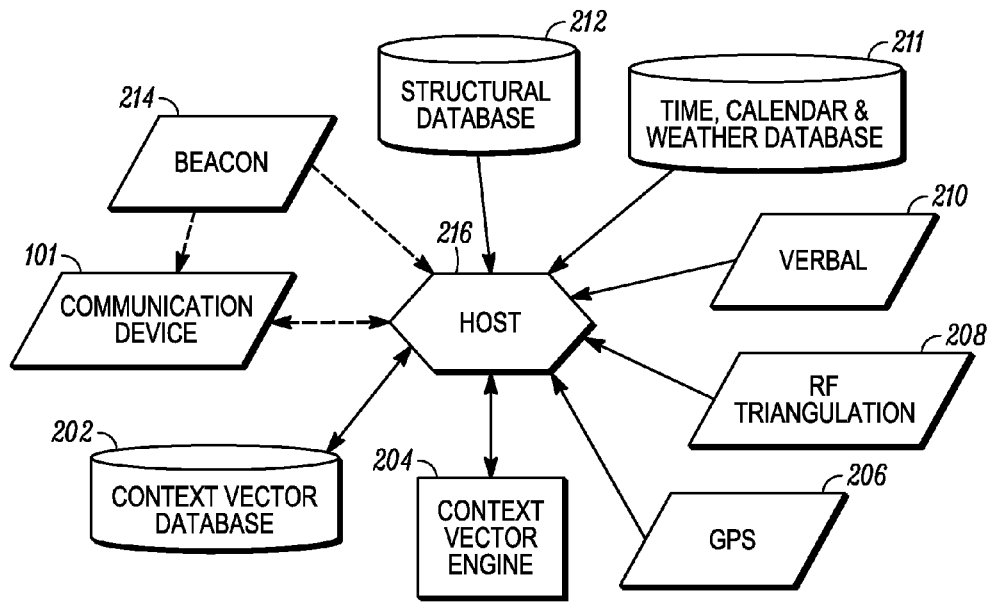
FIG. 2 is an illustration of a communication system including environmental sensors, a context database, and location technology devices in accordance with an embodiment of the present invention.

Referring to FIG. 2, a communication system 200 can include the communication device 101 having a plurality of environmental sensors. The context vectors can be determined locally to the communication device 101 or can be determined remotely based on where a host 216 resides. In any event, a matching algorithm in a context vector engine 204 can be used to periodically match a current context vector with a database of context vectors 202 by computing the vector or vector distance. If the vector does not match a known vector, then a new vector is recorded. If a vector matches one or more vectors, then other location means are used in complementary fashion to select the correct vector. It is possible the matched vector is inconsistent with other location means, so the matched vector is treated as a new context vector. Note, the host 216 can use a GPS 206, RF triangulation 208, verbal inputs 210, a structural database 212 (containing floor levels or room names and corresponding light frequencies, sound levels, temperatures, or light types for example), or a location beacon 214 to provide location information or serve as the location means. Furthermore, the communication system 200 can utilize a database 211 that can provide an appropriate context for a given time and date particularly with respect to weather or known temperature ranges as will become further apparent in the examples below.

Context vectors can also be pre-defined and loaded into a device, which ensures that areas not previously visited are known. This approach also allows known changes in context based on time to be accommodated. For example, one location could have three vectors with three mutually exclusive time windows. In the table below, three vectors associated with three locations of a building are shown which could be "pre-loaded" into a device.

|  | Metric | | |
| --- | --- | --- | --- |
|  | V1 | V2 | V3 |
| Temp | 20-30 | −10-32 | 23-28 |
| Humidity | 70-90% | 0-20% | 30-40% |
| Pressure | — | — | — |
| Light | Yes | Yes | Yes |
| Frequency | 440 | 60 | 60 |
| Intensity | High | Low | Moderate |
| Type | Florescent | Incandescent | Incandescent |
| Scent | Musty | None | None |
| C02 | 40% | 45% | 20% |
| O2 | 40% | 45% | 20% |
| N2 | 40% | 45% | 20% |
| Audio | | | |

-continued

|  | Metric | | |
| --- | --- | --- | --- |
|  | V1 | V2 | V3 |
| SPL | 15 | 10 | 0 |
| Tone | Low | med | None |
| Frequency | <60 | <440 | None |
| Latitude | 38.896618 | 38.89653954 | 38.89653954 |
| Longitude | −77.09623 | −77.0602473 | −77.0602473 |
| Altitude | −5 | 30 | 70 |
| Common Name | Basement | Restaurant Fridge | Third Floor Café |

Facilities re-organization, lighting changes, and usage changes can invalidate context vectors over time. Known vectors which mismatch their location can be reported to a central location tracking system such as the host 216, which can take the aggregate data from all radios and detect changes. A system administrator can then determine whether a master vector list or structural database 212 for a building should be updated. Embodiments herein can enable a master context vector database such as context database 202 to send updates to local radios such as device 101.

U.S. Pat. No. 6,801,159 B2 by Motorola, Inc. discusses examples of transitioning innovation that utilizes technology based metrics to switch between technologies based on tracking capability. The embodiments disclosed switch to alternate technologies when the metric "within" the tracking unit determines it has navigated through a pre-defined location.

In a similar manner, but unique to this application, the primary location technology (GPS) can transition to alternate technology where the alternate technology is a basic sensor, like a Beacon detector or other sensor, that senses context information (such as light or pressure changes or modulations). Similarly to Beacons, context information can be coded.

The information is either empirically measured, such as modulated light or flicker rates, or purposefully designed. Other context measurement detection schemes can be employed so that a database is used to identify location. As an example, the basement of a building where laundry is done is consistently at: humidity 67-90%, temperature 25-35 C, sound level: SPL+15-20 dB over normal, scent: Fragrant+Musty, light: 8-5 PMHigh, 440 Hz, is defined at Latitude=X, Longitude=Y, Altitude=Z. This would be unique for each structure.

Beacon IDs can be used to describe floors, floor sectors, or particular rooms having given Latitude and Longitude (but not necessarily a precise location) within the building. In a like fashion, a table can be created that utilizes the context aware sensors and database to form context vectors similar to the vectors discussed above.

An alternate embodiment herein can detect changes in context rather than actual location changes that can be useful in the support of location applications. For location applications, it can be desirable to detect a transition between an "indoor context" and an "outdoor context", which are two mutually exclusive contexts. In this embodiment, the goal is not absolute or relative location, but a reliable means to detect among a set of contexts and the transitions between such contexts. This information, for example, can assist a radio in selecting the appropriate location technology most likely to be successful based on knowledge of the indoor context or an outdoor context.

Using the previous example, detection of a context change to indoors, location technologies on a "hard list" can be activated. Some of these may already have been active, but those that were previously inactive will now be activated. Those technologies on the hard list are ones that are very likely to be used in the new context. Additionally, a "soft list" of location technologies is known for the new context. The soft list contains technologies that may be helpful in the new context. For example, a GPS receiver would be on the soft list for an indoor context change, because it may work in some indoor locations. Technologies on the soft list are used in a secondary manner, meaning they are disfavored compared to those on the hard list. In the case of GPS, should the signal continue to be present, the GPS signal can be utilized, however, if the signal is lost, use of the GPS would be discontinued or re-acquisition would be attempted less frequently.

Upon detection of a context change to outdoors, location technologies on a "hard list" associated with that context are activated. Similarly, a separate "soft list" of location technologies is known for the outdoor context. In the one embodiment, a GPS subsystem would be re-activated upon transition to an outdoor context because it would appear on the hard list.

In the case of GPS, an outdoor to indoor transition can be noted and signal strength could be monitored. If a fix is still obtainable, then the GPS could remain on. If a fix is not obtainable, then the GPS can be shut down until an indoor to outdoor transition is detected. In contrast, without the disclosed techniques, the GPS unit may end up staying on because the radio cannot discern between an indoor poor coverage condition and an outdoor poor coverage condition such as dense foliage, awnings, or other obstructions. This technique could result in appreciable savings in power and improved battery life, because the GPS unit could be shut off or signal acquisition could be attempted less frequently when indoors, but used continuously or more aggressively when outdoors.

In yet another example, temperature and/or pressure can be used to detect transitions between indoor and outdoor environments. Indoors, temperature-controlled air is typically sent through air handling units to manage and equalize the temperature throughout the building. During this process, the temperature goes through cycles that are readily detected by today's pressure/temperature sensors (such as sensors made by Intersema Sensoric SA). During normal radio operation, the ambient temperature and pressure is periodically sampled and a recent history is maintained. An indoor temperature variation profile would tend to be more erratic or volatile while an outdoor temperature variation profile would be more subtle. Thus, an analysis of recent temperature can indicate with good confidence whether the radio is indoors or outdoors by monitoring the temperature and pressure cycles commonly found indoors.

If a real time clock or GPS is available, calendar and/or location information can also be used to detect obvious, non-subtle transitions very quickly. For example, in summertime in Arizona, a sudden increase in temperature suggests a transition to outdoors. In wintertime in the Northeast, a sudden increase in temperature suggests a transition to indoors.

If the location tracking system has access to temperature and pressure information within a large building from various temperature sensors, a context change can also be easily detected. This information could be provided over a primary data channel or it could be transmitted by low-power local beacons over an FM sub-channel for example. Further note, large scale air handling units (AHUs) used in large buildings can be controlled and managed using software. Such software is used to control the mechanics that manage the temperature, pressure, and airflow throughout the building. Such indoor environmental software can enable one to accurately predict temperature transitions in or out of the facility. Further note that an AHU can include sensors that allow measurement of instantaneous temperature, but the determination of a rate of change as well. Hence, determining in/out locations can be done by measuring the rate of change of temperature/pressure as well since indoor pressure changes occur at significantly faster rates than outdoor.

Embodiments herein can include numerous variations that take advantage of the particular location technologies and environmental sensors available. In one particular enhancement, GPS can be used to determine the current country and through the use of a look-up table in the radio firmware, select the appropriate power frequency to detect (whether 50 Hz or 60 Hz) based on the current country. In yet another arrangement, beacons can transmit context information, where a portion of the context is purposefully designed to identify a unique location. Note, the beacons do not need to be radio frequency transmitted data, but can be a purposefully altered device that manipulates the environment and gives a particular indicia of location or context. For example, an electronic ballast may have an adjustable frequency which could be used to indicate the floor or level. For example: 400 Hz=Floor 1; 415 Hz=Floor 2; and 430 Hz=Floor 3.

Figure 3:
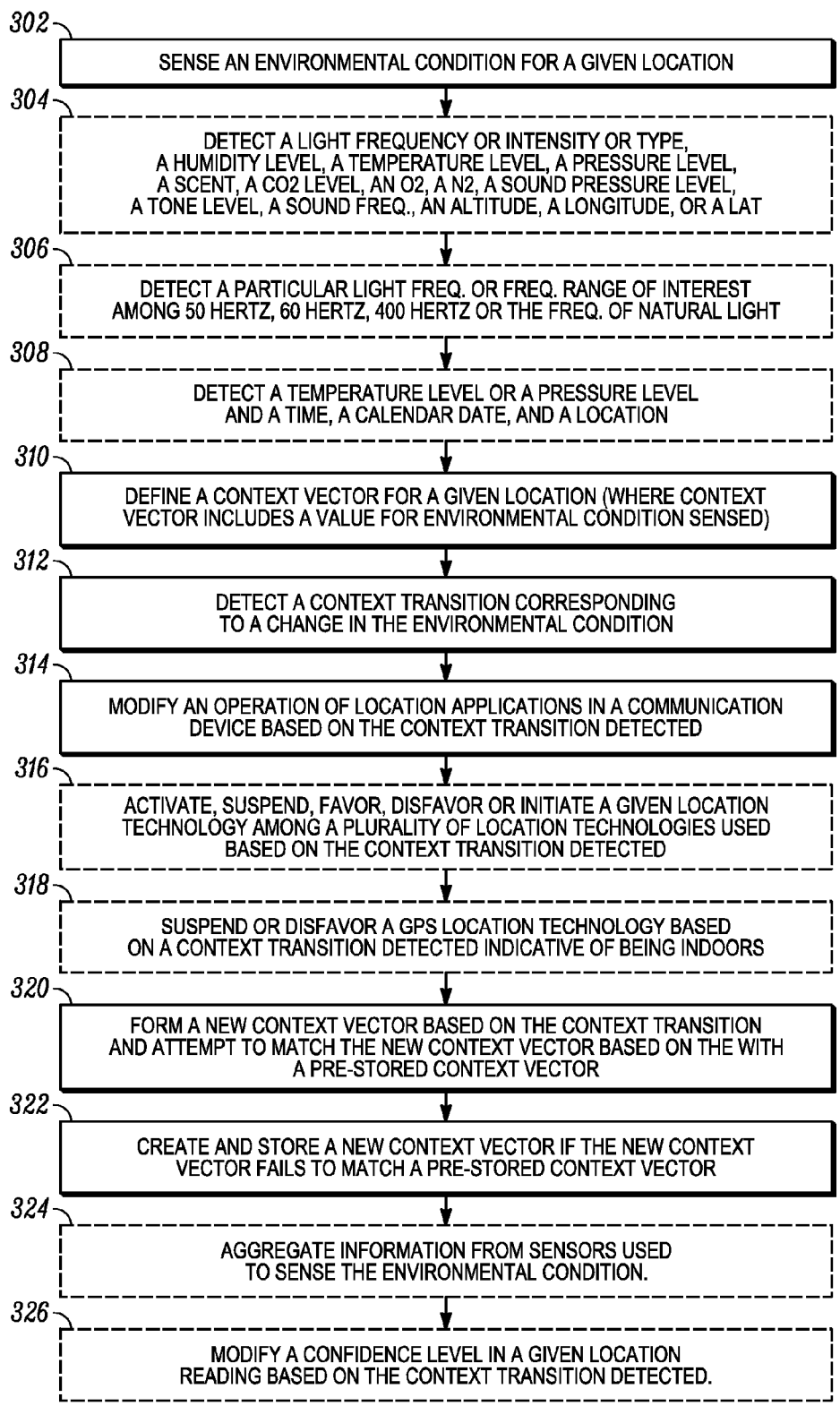
FIG. 3 is a flow chart illustrating a method of using context vectors in location applications in accordance with an embodiment of the present invention

Referring to FIG. 3, a method 300 of using context vectors in location applications is shown and can include the step 302 of sensing an environmental condition for a given location such as detecting at step 304 a light frequency, a light intensity, a light type, a humidity level, a temperature level, a pressure level, a scent, a carbon dioxide level, an oxygen level, a nitrogen level, a hazardous gas detector, a sound pressure level, a tone level, a sound frequency, an altitude, a longitude, or a latitude or in a particular embodiment or detecting at step 306 a particular light frequency or frequency range of interest among 50 Hertz, 60 Hertz, 400 Hertz or the frequency of natural light, or detecting at step 308 a temperature level or a pressure level and a time, a calendar date, and a location. The method 300 can further include the step 310 of defining a context vector for the given location (where the context vector includes a value for the environmental condition sensed), detecting a context transition corresponding to a change in the environmental condition at step 312 and modifying an operation of location applications in a communication device based on the context transition detected at step 314. The step of modifying can involve activating, suspending, favoring, disfavoring or initiating a particular location technology among a plurality of location technologies used in a communication device based on the context transition detected at step 316. In one arrangement, the step of modifying can involve suspending or disfavoring a GPS location technology used in a communication device based on a context transition detected indicative of being indoors at step 318. The method 300 can further include the step 320 of forming a new context vector based on the context transition and attempting to match the new context vector with a pre-stored context vector. If the new context vector fails to match a pre-stored context vector at step 322, then a new context vector can be created and stored. The method 300 can optionally aggregate information from sensors used to sense the environmental condition at step 324. The method 300 can also optionally modify a confidence level in a given location reading based on the context transition detected at step 326.

Further note that embodiments herein can also include pre-loading context information into a radio or into a database to define a location or optimize a confidence level for a given location. For example, by sensing an environmental condition for a given location, a first context vector can be defined for that given location including a value for the environmental condition. The first context vector can be based on an aggregate of one or more sensors, each associated with the environmental condition. The location of a communication device can now be established by comparing the first context vector with a second context vector, the second context vector being associated with the given location. The first context vector can be stored as the second context vector when the first context vector fails to match the second context vector to provide location and/or refinement of the location. This stored second context vector can also be uploaded to a database to enable other communication devices on a network to access the uploaded context vector to provide increased confidence of the location.

In light of the foregoing description, it should be recognized that embodiments in accordance with the present invention can be realized in hardware, software, or a combination of hardware and software. A network or system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A method of using context vectors in location applications, comprising:
   sensing, from a portable radio, an environmental condition external to the portable radio for a given location without using location signaling, the environmental condition comprising one or more of a light frequency, a light intensity, a light type, a humidity level, a temperature level, a pressure level, a scent, a carbon dioxide level, an oxygen level, a nitrogen level, a sound pressure level, a tone level, a sound frequency, an altitude, a longitude, or a latitude;
   defining a context vector for the given location, wherein the context vector includes a value for the environmental condition sensed external to the portable radio;
   detecting a context transition corresponding to a change in the environmental condition external to the portable radio;
   modifying an operation of location applications in the portable radio based on the context transition detected, wherein the step of modifying the operation of location applications comprises activating, suspending, favoring, disfavoring or initiating a particular location technology among a plurality of location technologies used in the portable radio based on the context transition detected;
   forming a new context vector based on the context transition and attempting to match the new context vector with a pre-stored context vector; and
   storing the new context vector if the new context vector fails to match the pre-stored context vector.

2. The method of claim 1, wherein the method further comprises the step of aggregating information from sensors used to sense the environmental condition.

3. The method of claim 1, wherein the step of detecting the environmental condition comprises detecting a particular light frequency or frequency range of interest among 50 Hertz, 60 Hertz, 400 Hertz, 440 Hertz or the frequency of natural light.

4. The method of claim 1, wherein the step of modifying the operation of location applications comprises suspending or disfavoring a GPS location technology used in the portable radio based on a context transition detected indicative of being indoors.

5. The method of claim 1, wherein the step of detecting the environmental condition comprises detecting a temperature level or a pressure level and a time, a calendar date, and a location.

6. The method of claim 1, wherein the method further comprises modifying a confidence level in a given location reading based on the context transition detected.

7. The method of claim 1, wherein the step of detecting further comprises:
   detecting a transition between indoors and outdoors; and
   suspending or modifying GPS operation of the portable radio in response to the portable radio transitioning from outdoors to indoors.

8. A communication system using context vectors in location applications, comprising:
   a portable radio comprising:
      a transceiver;
      a plurality of environmental sensors including at least two location technology devices; and
      a processor coupled to the transceiver and the plurality of environmental sensors, wherein the processor is programmed to:
         sense an environmental condition external to the portable radio for a given location without using location signaling, the environmental condition comprising one or more of a light frequency, a light intensity, a light type, a humidity level, a temperature level, a pressure level, a scent, a carbon dioxide level, an oxygen level, a nitrogen level, a sound pressure level, a tone level, a sound frequency, an altitude, a longitude, or a latitude;
         define a context vector for the given location, wherein the context vector includes a value for the environmental condition sensed;
         detect a context transition corresponding to a change in the environmental condition external to the portable radio;
         modify an operation of the at least two location technology devices based on the context transition detected, wherein modifying the operation of the at least two technology devices comprises activating, suspending, favoring, disfavoring or initiating a particular location technology device among the at least two location technology devices used in the portable radio based on the context transition detected;
         form a new context vector based on the context transition and attempt to match the new context vector with a pre-stored context vector and further create a new context vector; and
         store the new context vector if the new context vector fails to match a pre-stored context vector.

9. The communication system of claim 8, wherein the plurality of sensors comprises a temperature sensor, a light sensor, a pressure sensor, a gas sensor, or a portable inertial navigation system, and the processor is further programmed to aggregate information from the plurality of sensors used to sense the environmental condition.

10. The communication system of claim 8, wherein the processor is further programmed to detect the environmental condition by detecting a light frequency, a light intensity, a light type, a humidity level, a temperature level, a pressure level, a scent, a carbon dioxide level, an oxygen level, a nitrogen level, a hazardous gas detector, a sound pressure level, a tone level, a sound frequency, an altitude, a longitude, or a latitude.

11. The communication system of claim 8, wherein the processor is programmed to detect the environmental condition by detecting a particular light frequency or frequency range of interest among 50 Hertz, 60 Hertz, 400 Hertz, 440 Hertz, or the frequency of natural light.

12. The communication system of claim 8, wherein the at least two location technology devices comprises at least a GPS device and the processor is further programmed to modify the operation of the GPS device by suspending or disfavoring the GPS device used in the portable radio in favor of another location technology device based on a context transition detected or a context vector detected indicative of being indoors.

13. The communication system of claim 8, wherein the processor is further programmed to detect the environmental condition by detecting a temperature level or a pressure level and a time, a calendar date, and a location.

14. A method for using context vectors in location applications, comprising the steps of:

sensing, from a portable radio, an environmental condition external to the portable radio for a given location without using location signaling, the environmental condition comprising one or more of a light frequency, a light intensity, a light type, a humidity level, a temperature level, a pressure level, a scent, a carbon dioxide level, an oxygen level, a nitrogen level, a sound pressure level, a tone level, a sound frequency, an altitude, a longitude, or a latitude;

defining a first context vector for the given location, wherein the first context vector includes a value for the environmental condition external to the portable radio;

comparing the first context vector to a second context vector associated with the given location, wherein the second context vector of the portable radio is pre-loaded into the portable radio;

establishing a location of the portable radio based on the comparison of the first context vector and the second context vector of the portable radio; and storing the first context vector as the second context vector when the first context vector fails to match the second context vector.

15. The method of claim 14, further comprising the step of uploading the stored second context vector to a database to enable other portable radios on a network to access the uploaded context vector.

16. The method of claim 14, wherein the value for the first context vector is based on an aggregate of one or more sensors, each associated with the environmental condition.

* * * * *